United States Patent

Scuffham et al.

[15] 3,663,169

[45] May 16, 1972

[54] METAL SEPARATION

[72] Inventors: James Barrie Scuffham, Teesside; George Allan Rowden, Stockton-on-Tees, both of England

[73] Assignee: Power-Gas Limited, London, England

[22] Filed: May 5, 1970

[21] Appl. No.: 34,854

Foreign Application Priority Data

May 8, 1969    Great Britain....................23419/69

[52] U.S. Cl.................................23/200, 23/305, 75/108, 75/119
[51] Int. Cl..........................................C01g 49/02
[58] Field of Search..............23/200, 315, 305; 75/103, 108, 75/119; 252/448; 210/54; 209/53

[56] References Cited

UNITED STATES PATENTS

| | | | |
|---|---|---|---|
| 961,934 | 6/1910 | Carrick | 75/108 X |
| 2,647,827 | 8/1953 | McGauley | 75/108 X |
| 2,647,828 | 8/1953 | McGauley | 23/200 X |
| 2,492,808 | 12/1949 | Marsic et al. | 252/448 |
| 3,464,928 | 9/1969 | Mathies | 252/448 X |

Primary Examiner—Oscar R. Vertiz
Assistant Examiner—G. O. Peters
Attorney—Holcombe, Wetherill & Brisebois

[57] ABSTRACT

In the present process a first metal value of a metal of which the hydroxide is insoluble is separated from a salt of the first metal and a salt of the second metal which forms a soluble ammine. The mixture is passed through an inert liquid barrier into ammonium hydroxide where the first metal is precipitated as its hydroxide and the second remains in solution as an ammine. Preferably the mixture is dripped through the liquid barrier into ammonium hydroxide below it.

9 Claims, No Drawings

METAL SEPARATION

This invention relates to the separation of a metal value from a mixture of metal salts.

According to the invention a process for separating a first metal value, of a metal of which the hydroxide is insoluble, from a mixture of a salt of the first metal and a salt of a second metal which forms a soluble ammine with ammonium hydroxide comprises passing an aqueous solution of the mixture through a liquid barrier material into ammonium hydroxide having an interface with the material so as to precipitate the first metal as its hydroxide and to form a solution of an ammine of the second metal, and removing the first metal hydroxide.

The barrier material must not react deleteriously, for operation of the process, with the salt mixture or ammonium hydroxide and is preferably inert in the conditions obtaining. Furthermore, the barrier material is immiscible with the salt solution and the alkaline solution, and must allow passage of the solution through the interface with the ammonium hydroxide. Preferably the density of the liquid barrier material is less than that of the ammonium hydroxide and the barrier liquid forms an upper layer while the ammonium hydroxide forms a lower layer.

The hydroxide produced can be further treated, by heating, to prepare the corresponding oxide with subsequent reduction to the metal or treated to reduce the hydroxide to the metal.

The term "hydroxide" herein includes "hydrated oxide".

An example of the first metal value is $Fe^{+++}$ and examples of the second metal are Cu, Co, Ni, Zn, Ag and Cd.

The solution of the mixture preferably has a discrete configuration, for example a droplet formation. Thus the solution can be dripped or sprayed or passed as a continuous small diameter stream into the barrier layer. A modifying agent for example a polysaccharide, e.g. carob gum, can be mixed with the solution to make the first metal hydroxide produced easier to handle.

The pH of the solution of the mixture should be such that the solution of the mixture is substantially undhydrolysed. To achieve this it is often necessary, and in general preferable, for the solution to contain an acid. Among suitable acids are nitric acid and hydrochloric, and the salts preferably are those of the acid used, if these are sufficiently soluble.

A variety of substances, e.g. amyl acetate, ethyl benzene, m-xylene, n-hexane, can be used as the barrier material.

Ambient temperatures are in general to be preferred although higher temperatures can be used if the two layers can be maintained satisfactorily.

The ammine solution can be heated to recover ammonia for recycling, while the ammine is decomposed, e.g. to form the oxide of the metal.

The invention will now be illustrated by specific examples.

Example 1

A 2N sulfuric acid solution of ferric sulfate and nickel sulfate, containing 25g/liter of $Fe^{+++}$ and $Ni^{++}$ respectively, is dropped, as small droplets, into a wide tube containing a lower layer of 0.88 ammonium hydroxide and an upper layer of amyl acetate.

The droplets pass through the upper layer and initially rest upon the interface between the two layers. The droplets coalesce into larger droplets, but the interface momentarily holds the droplets until their weight causes them to break through into the second layer. Here spheres of ferric hydroxide are formed, the ammonium hydroxide solution turning blue and thus indicating the formation of a soluble nickel ammine.

Example 2.

The process described in Example 1 is carried out using a mixture of ferric and nickel chlorides in 2N HCl with a similar result.

We claim:

1. A process for separating a $Fe^{+++}$ metal salt which reacts with ammonium to form an insoluble precipitate, from a mixture of a salt of the $Fe^{+++}$ salt and a salt of a second metal selected from the groups consisting of Cu, Co, Ni, Zn, Ag, and Cd which forms a soluble ammine with ammonium hydroxide comprising passing an aqueous solution of the salt mixture through a water immiscible inert liquid barrier material into ammonium hydroxide having an interface with the material so as to precipitate the $Fe^{+++}$ metal as its hydroxide and to form a solution of an ammine of the second metal, and removing the $Fe^{+++}$ metal hydroxide from the ammonium hydroxide.

2. The process of claim 1 in which the liquid barrier material comprises an upper layer and the ammonium hydroxide a lower layer.

3. The process of claim 2 in which the liquid barrier material is selected from the group consisting of amyl acetate, ethyl benzene, m-xylene and n-hexane.

4. The process of claim 1 in which iron is produced from its hydroxide.

5. The process of claim 1 in which the solution of the salt mixture has a discrete configuration.

6. The process of claim 1 in which the solution is dripped or sprayed or passed as a continuous small diameter stream into the barrier material.

7. The process of claim 1 in which a polysaccharide modifying agent is included in the solution which is capable of enchancing the handleability of the first metal hydroxide.

8. The process of claim 7 in which the polysaccharide is carob gum.

9. The process of claim 1 in which the ammine solution is heated to recover ammonia and the ammonia is recycled, the ammine being decomposed to the oxide of the second metal.

* * * * *